United States Patent [19]
Nepela et al.

[11] Patent Number: 5,568,981
[45] Date of Patent: Oct. 29, 1996

[54] NEGATIVE PRESSURE AIR BEARING SLIDER

[75] Inventors: Daniel A. Nepela, San Jose; Ciuter Chang, Fremont; Yiao-Tee Hsia, Pleasanton; Rajendra Bhadra, Fremont, all of Calif.

[73] Assignee: Read-Rite Corporation, Milpitas, Calif.

[21] Appl. No.: 419,760

[22] Filed: Apr. 10, 1995

Related U.S. Application Data

[63] Continuation-in-part of Ser. No. 293,882, Aug. 19, 1994, abandoned.

[51] Int. Cl.⁶ .................................................. F16C 32/06
[52] U.S. Cl. ................................................ 384/12; 384/123
[58] Field of Search ............................. 384/123, 122, 384/12, 111, 112, 121

[56] References Cited

U.S. PATENT DOCUMENTS

| | | | |
|---|---|---|---|
| 4,974,970 | 12/1990 | Sugita et al. | 384/12 |
| 5,098,204 | 3/1992 | Blanz | 384/12 |
| 5,112,141 | 5/1992 | Asada et al. | 384/122 |
| 5,407,280 | 4/1995 | Heinzl et al. | 384/12 |

*Primary Examiner*—Lenard A. Footland
*Attorney, Agent, or Firm*—Nathan N. Kallman

[57] ABSTRACT

A negative pressure air bearing slider is provided with side rails, a central negative pressure cavity between the side rails and one or more relief vents at the leading edge of the slider. The side rails extend fully or partially from tapered regions at the leading edge of the slider to the trailing edge of the slider. Air bearing pads disposed adjacent to the front tapered regions and/or the slider trailing edge may be configured with the side rails. By virtue of the slider design, variations in flying height and roll are minimized.

30 Claims, 9 Drawing Sheets

NEGATIVE PRESSURE AIR BEARING SLIDER

This application is a continuation-in-part of application Ser. No. 08/293,882, filed Aug. 19, 1994, abandoned.

FIELD OF THE INVENTION

This invention relates to air bearing sliders of magnetic head assemblies used in disk drives and in particular to negative pressure air bearing sliders having negative pressure areas.

DESCRIPTION OF THE PRIOR ART

Magnetic head assemblies that fly relative to rotating magnetic disks are used extensively in disk drives for recording or reading data. Air bearing sliders used in disk drives typically have a leading edge and a trailing edge. One or more thin film magnetic transducers are deposited at the trailing end of the slider. Generally, the sliders have tapered portions at the leading edge and longitudinal rails that extend from the tapers all or part way to the trailing edge.

In accessing the magnetic disks for recording and playing back data from disks using a rotary actuator, the magnetic head or transducer continuously experiences velocity and skew angle variations while moving from one data track to another data track of the disk. A major objective is to maintain a very close, constant, and stable spacing between the disk surface and the magnetic transducer carried by the head slider to achieve high storage density. A close spacing, coupled with very narrow transducing gaps and very thin magnetic record films, allows recording of very short wavelength, high frequency signals, thereby maximizing the density and storage capacity of data recording. Constant spacing between the flying head slider and the disk surface minimizes the fluctuations in signal amplitude, thereby optimizing signal resolution. This constant spacing must be maintained as the head slider moves between the inner and outer tracks of the disk surface. Therefore the effects of the change in skew on the flying height must be held to a minimum.

In the design and manufacture of negative pressure air bearing sliders to achieve constant flying height for transducers, it is desirable to have the following attributes;

1. The negative pressure air bearing slider should have a broad velocity range over which the flying height of the transducer remains substantially constant within specified tolerance. That is, the sensitivity of flying height variation of the negative pressure air bearing slider should be minimized relative to velocity.

2. The negative pressure air bearing slider should have a broad skew angle range over which the flying height of the transducer remains constant within specified tolerance. That is, the sensitivity of the flying height variation of the negative pressure air bearing slider should be minimized relative to skew angle.

3. As the transducer moves between the inner radial track and the outer radial track of the magnetic recording disk, the negative pressure air bearing slider should have minimum roll and minimum roll variation to realize reliability and stability.

4. The negative pressure air bearing slider should have high pitch for improvement of take-off velocity and reliability of the slider.

5. The characteristics of the negative pressure air bearing slider should have a high degree of tolerance to manufacturing variables, such as gimbal location offset variations, load variation and geometry variations.

6. The production process steps should be minimized to simplify the manufacture of the negative pressure air bearing slider.

7. The design of the negative pressure air bearing should have longitudinal symmetry characteristics such that a single design of the slider may be used as UP and DOWN sliders with the respective upper and lower surfaces of the magnetic disk.

Prior art negative pressure air bearing slider designs have traded off simplicity of design to obtain desired flying characteristics. For example, complex geometry requiring several etch levels has been used which increase manufacturing process complexity and costs. Asymmetrical geometry has been used which needs a different process setup for making UP and DOWN sliders.

SUMMARY OF THE INVENTION

An object of this invention is to provide a negative pressure air bearing slider that experiences minimal changes in flying height and roll over a broad range of velocity and skew angle variations in a disk drive system.

Another object of the invention to provide a negative pressure air bearing slider that requires only a single etch step during production.

Another object is to provide a negative pressure air bearing slider that is longitudinally symmetrical and can be flown on either surface of a rotating disk with equal flying characteristics.

A further object is to provide a negative pressure air bearing slider that exhibits a high degree of tolerance to manufacturing variables such that the flying characteristics of the negative pressure air bearing slider will remain within tight tolerance.

In a preferred embodiment of this invention, a negative pressure air bearing slider is made longitudinally symmetrical in design and requires only one etch process to form the slider. The negative pressure air bearing slider has two side rails providing air bearing surfaces extending fully from the leading edge towards the trailing edge of the slider, and a central pad at the leading edge for providing an additional air bearing surface. Relief vents are formed between the two side rails and the central pad and extend from the slider leading edge to connect to a central recessed cavity that extends from the central pad to the trailing edge of the slider. The central recessed cavity defines an effective negative pressure region. The relief vents and central recessed cavity are etched to a uniform depth. The amount of negative pressure is determined by the size, the depth and the location of the cavity for a given operational condition.

In alternative embodiments, the side rails may extend partially or fully from the tapered regions towards the trailing edge of the slider. Also the rails themselves may have recessed sections. Furthermore an additional pad may be provided at the trailing edge of the slider for controlling flying height. The depth of etching may differ between the relief vents and the central recessed cavity. An additional air bearing pad may be located at the trailing edge centered substantially between the sides of the slider. The slider may be configured with one or more relief vents at the leading edge.

BRIEF DESCRIPTION OF THE DRAWINGS

The invention will be described with reference to the drawings in which.

It should be noted that the Figures are not necessarily drawn to scale and that the proportions of the illustrated parts do not reflect actual dimensions which are used in the implementation of the invention.

DETAILED DESCRIPTION OF THE INVENTION

Figure 1:
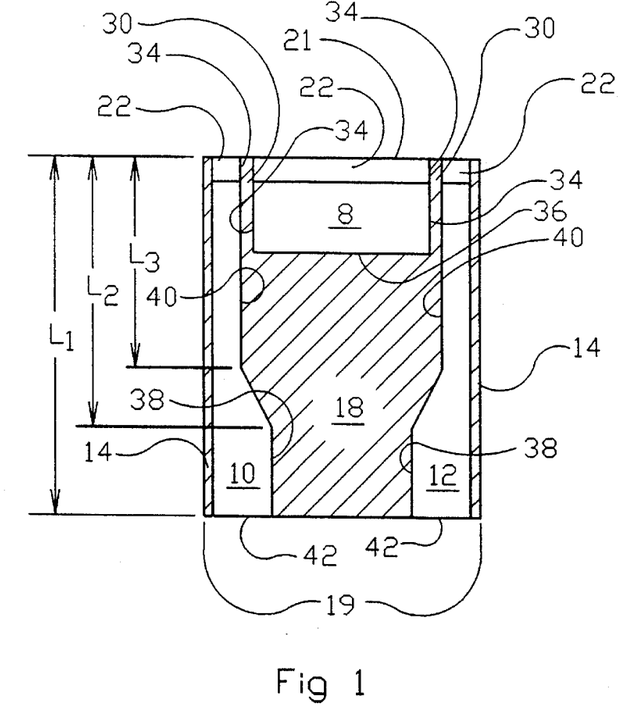
FIG. 1 is a plan view of the air bearing surface of a negative pressure air bearing slider, according to this invention.
Figure 1A:
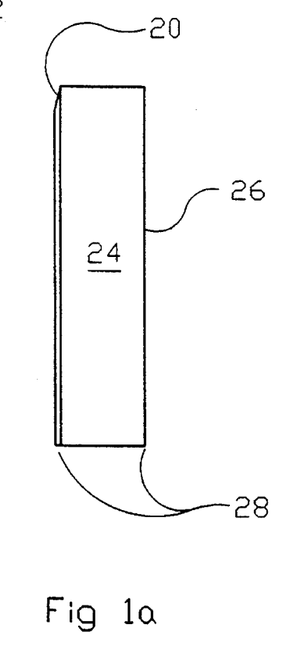
FIG. 1a is a side view of the negative pressure air bearing slider of FIG. 1.

With reference to FIGS. 1 and 1a, a rectangular slider body 24 has a length L1, a width designated by reference numeral 19 and a thickness designated by numeral 28. The slider 24 is configured with raised side rails 10 and 12, tapered regions 22 at the leading edge of the slider and a central pad 8 formed adjacent to the central taper 22. The tapered regions 22 are of identical length from the leading edge. The tapered regions 22 have a taper angle (shown at 20 in FIG. 1a) which may be in the order of 20 minutes to 60 minutes. A negative pressure cavity 18 is formed by etching between the central pad 8 and side rails 10, 12 and extending to the trailing edge of the slider. In keeping with this invention, relief vents 30 are formed between the side rails 10, 12 and the central pad 8 and extend from the leading edge of the slider to contact the negative pressure cavity 18. The relief vents 30 and cavity 18 are etched preferably to the same depth which may be in the range of 50–500 microinches.

The rails 10, 12 are symmetrically disposed on the air bearing surface of the slider. The rails 10, 12 have a wide portion located at the trailing edge of a length designated by reference numeral 38, with the width being designated by reference numeral 42. The rails 10, 12 converge from the trailing edge wide portions by an angled section shown between the distances L3 and L2 from the leading edge. The narrow portions of the rails 10, 12 extend between the angled sections and the tapered regions associated with the rails and have a length which is L3 less the length of the tapered regions 22.

In a specific embodiment of this invention, the width 19 of the slider is about 63 mils (milli-inches), and the length L1 is about 80.7 mils. The trailing edge rail width 42 is about 15 mils and the trailing edge rail length 38 is 25.7 mils. The leading edge rail length 40 is 45 mils and the width of each leading edge rail is 5 mils. The length of the tapered regions 22 is 8 mils. The central pad air bearing surface is 46 mils wide and 20 mils long. The relief vents 30 each are 2 mils wide and the side reliefs 14 at the sides of the slider body are 1.5 mils wide. The etch or relief depths of the central recessed cavity 18, the relief vents 30 and the side reliefs 14 are about 200 microinches relative to the raised air bearing surfaces of side rails 10, 12 and central pad 8. The lengths L1, L2 and L3 are respectively about 80.7 mils, 55 mils and 45 mils.

Figure 2A:
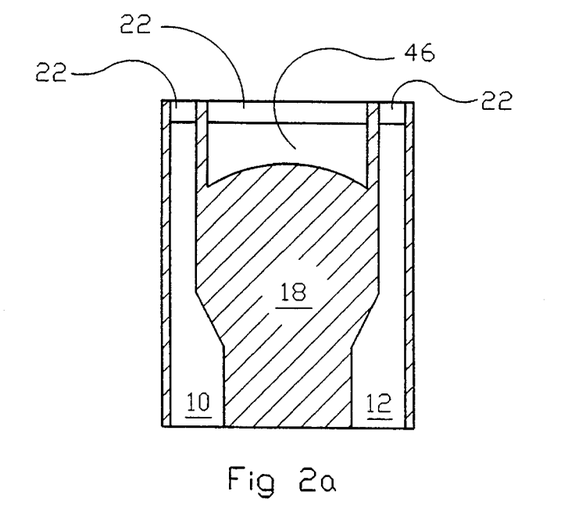
FIGS. 2a–2c are plan views of alternative embodiments having different shapes of the center rail structure of the air bearing slider of this invention.
Figure 2B:
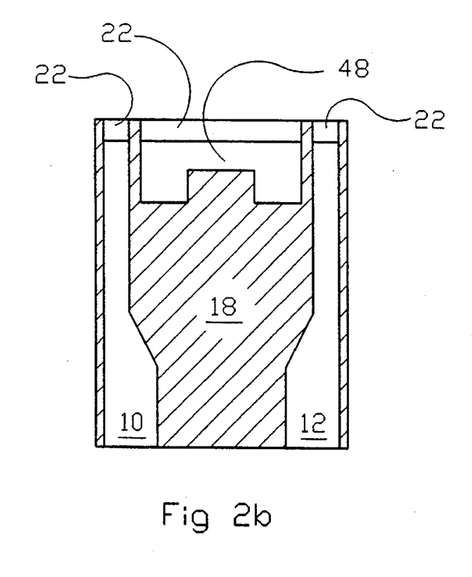
Figure 2C:
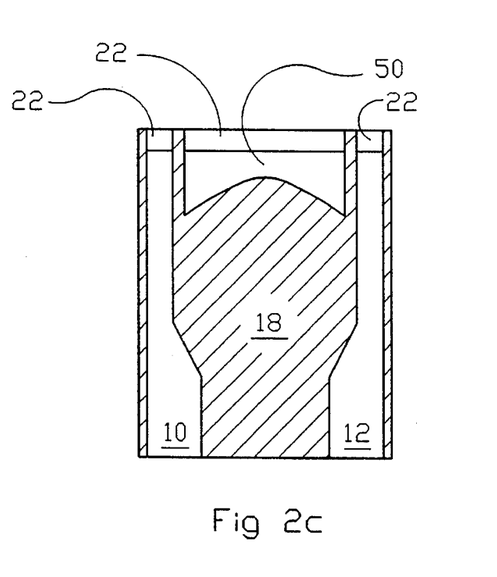

FIGS. 2a and 2c represent alternative embodiments of the invention wherein the central pad 46, 50 is formed with an arcuate side adjacent to the central negative pressure cavity 18. FIG. 2b illustrates a central pad 48 having an inverted U shape adjacent to the negative pressure cavity 18.

FIG. 3a–3d illustrate other alternative embodiments in which the side rails include negative pressure regions 48 formed at the outboard portions of the side rails 52, 54, in conjunction with the different shapes of the central pads 46, 66, 68, 70. The dimensions of the slider body are defined by length L1 and width 19 respectively. Rails 52 and 54 have leading and trailing edge widths 50 and a central narrow portion of width 56. The angled portion of the rails closest to the leading edge is defined between L4 and L5 and the angled portion of the rails closest to the trailing edge is defined between L6 and L7. The leading edge of the slider has a center pad 46 following the center tapered region 22. The center pad 46 has a width designated by reference numeral 60 and a length designated by reference numeral 58. The rails 52, 54 and pad 46 follow tapered regions 22 of equal length. Relief vents 62 are provided adjacent to the contiguous sides of the center tapered region and the central pad 46 and extend to the central negative pressure cavity 48. The relief vents 62 are symmetrically disposed with relation to the side rails 52, 54 which are symmetrically disposed within the slider body relative to the longitudinal axis of the slider. Side reliefs 64 are provided at the side edges of the slider to realize ease of fabrication.

Figure 3A:
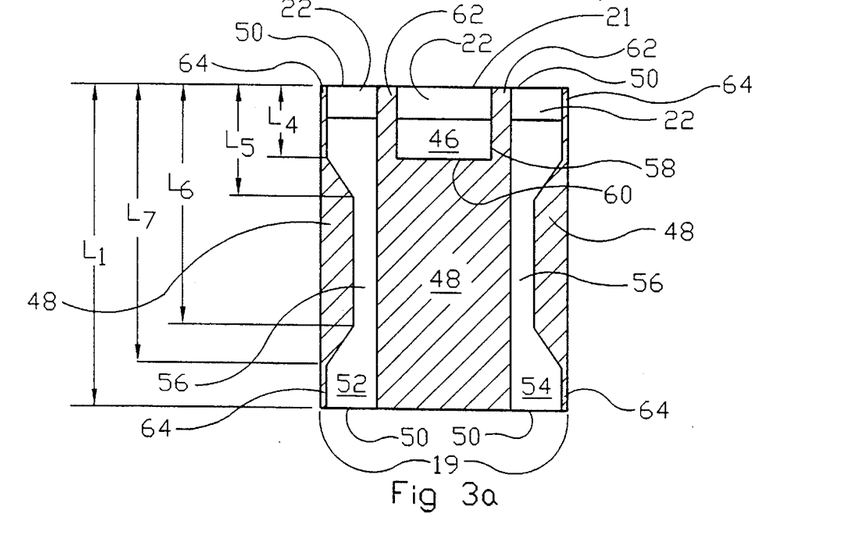
FIGS. 3a–3d are plan views of alternative embodiments of a negative pressure air bearing slider with a modified center rail structure and negative pressure regions associated with the side rails of the slider.

In a specific embodiment of FIG. 3a, the width 50 of the side tapered portions and the trailing edge sections of the rails 52, 54 is about 13 mils. The width of the central narrow section 56 of the rails is about 6 mils and the side reliefs 64 are about 1.5 mils wide. The overall slider length L1 is about 80.7 mils and the width of the slider is about 63 mils. The width 60 of the center pad 46 is about 24 mils and the length 58 of the center pad 46 is about 18 mils. The width of the relief vents 62 is about 5 mils each. The lengths further defining the dimensions of the side rails 52, 54 are about 18 mils for L4, 28 mils for L5, 60 mils for L6 and 70 mils for L7. The tapered regions 22 are 8 mils long and have a taper angle of 40 minutes.

The negative pressure cavity 48 is etched to a depth of 200 microinches below the air bearing surface represented by rails 52, 54 and pad 46. Although not shown, a nominal crown of ½ microinch is provided to the air bearing surface.

Figure 3B:
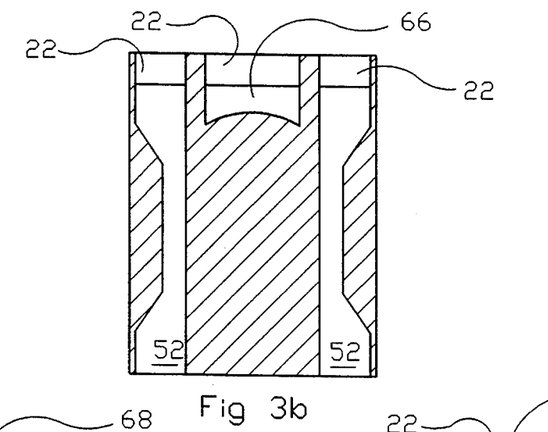
Figure 3C:
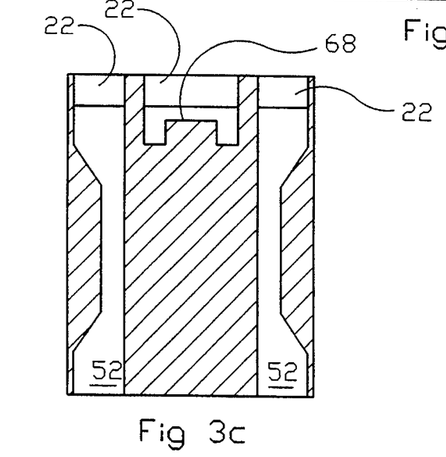
Figure 3D:
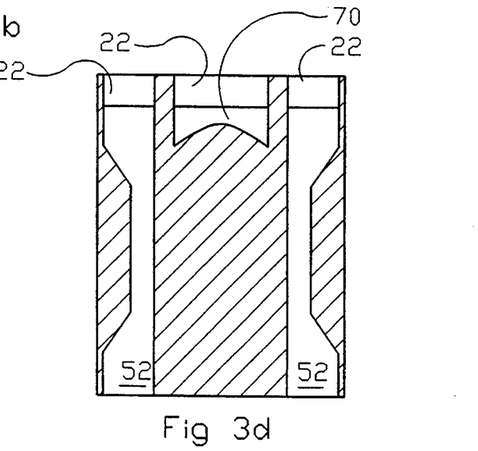

FIGS. 3b through 3d illustrate alternative embodiments wherein the shapes of the central pads 66, 68, 70 are modified for specific applications of skew angle range and velocity range so that the flying height variation over these ranges is minimized.

Figure 4A:
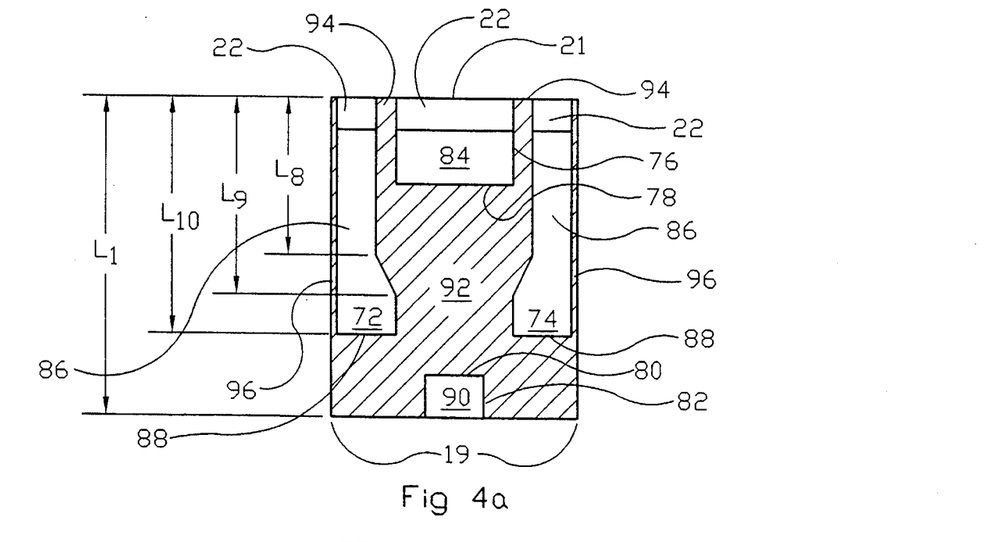
FIGS. 4a–4d are plan views of alternative embodiments of a negative pressure air bearing slider with a modified center rail structure and an additional rear pad.

FIG. 4a illustrate another embodiment of a negative pressure air bearing slider wherein the magnetic transducer is located at the trailing edge and at a rear central pad 90. This embodiment contains two side rails 72, 74 and a central front pad 84 as well as a rear pad 90. The negative pressure region 92 is located aft of the central rail 84. The side rails 72, 74 have a length L10, which is a partial length of the total slider length L1, and a width designated as 88 at the trailing edge of the side rails and a narrow width portion 86 at the leading edge of the side rails. The width 86 is constant from the tapered regions 22 to a point defined by length L8, at which the rails diverge to join the wider trailing edge rail portion at a point defined by the length L9. The rear central pad 90 has a length shown at reference numeral 82 and a width shown at reference numeral 80. At the leading edge 21 of the slider, tapered regions 22 are provided for side rails 72, 74 and central pad 84. Relief vents 94 are disposed between the inboard sides of rails 72, 74 and the front central pad 84 and extend from the leading edge to the recessed cavity 92.

Figure 4B:
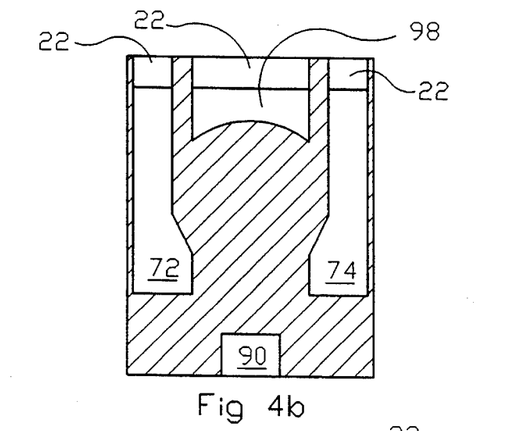
Figure 4C:
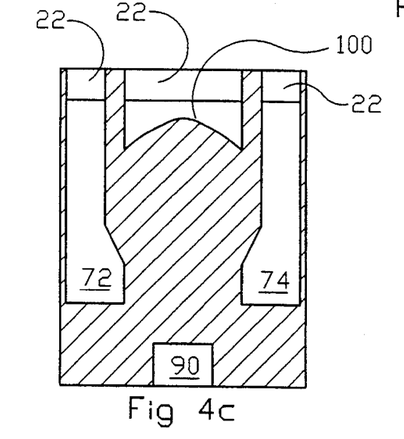
Figure 4D:
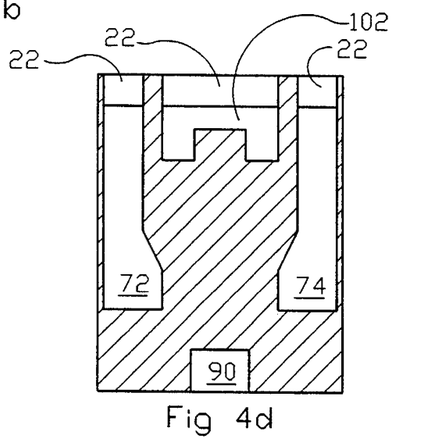

FIGS. 4b–4d represent alternative embodiments wherein the shapes of the central rails 98, 100, 102 are modified for specific applications of skew angle range and velocity range so that the flying height variation over these ranges is minimized.

In the implementation of FIG. 4a, the rear pad 90 has a length 82 of about 10.7 mils and a width 80 of about 15 mils. The center pad 84 has a length 76 of about 20 mils and a width 78 of about 30 mils. The widths 88 of the trailing edges of the side rails 72, 74 are about 15 mils and the width at the leading edge of the side rails is about 10 mils. The length L8 from the leading edge of rails 72 74 at which the rail diverges is about 50 mils and the length L9 is about 55 mils. The total rail length L10 of the side rails 72, 74 is about 60 mils. Side reliefs 96 are 1.5 mils wide and are provided for ease of fabrication of the slider of this invention. The relief vents 94 are about 5 mils wide.

Figure 5A:
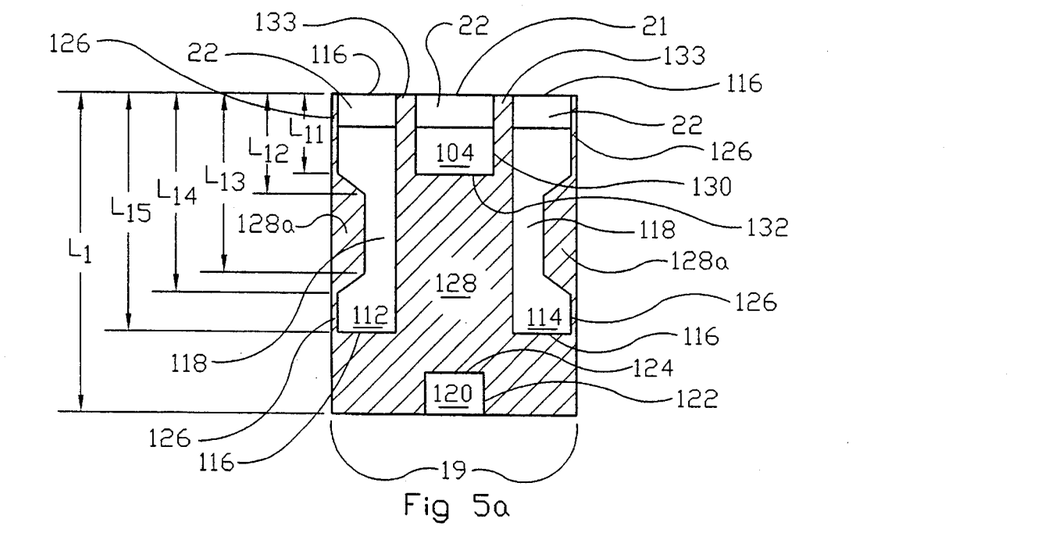
FIGS. 5a–5d are plan views of alternative embodiments of a negative pressure air bearing slider with a modified center rail structure, negative pressure regions associated with the side rails of the slider, and an additional rear pad.

FIG. 5a illustrates another embodiment of a negative pressure air bearing slider having two side rails 112, 114, a central pad 104 and a rear pad 120. The rear pad 120 has a trailing edge on which a magnetic transducer is disposed. The length of the rear pad 120 is designated by reference numeral 122 and the width is designated by reference numeral 124. The dimensions of the central leading edge pad 104 are designated by a length 130 and a width 132. The two side rails 112, 114 have a width designated by 116 at both the leading and trailing edges and are formed with a central portion of a narrower width designated by 118. The side rails 112, 114 have a width designated by 116 at the leading edge and trailing edge of the rails at lengths L11 and L15 respectively and a narrower portion 118 between the leading and trailing portions of the rails from length L12 to L13. Relief sections 126 are provided for ease of manufacturing. The embodiment of FIG. 4a includes negative pressure cavities 128a that are associated with each side rail 112, 114 and a central negative pressure cavity 128 that extends from the center pad.

Figure 5B:
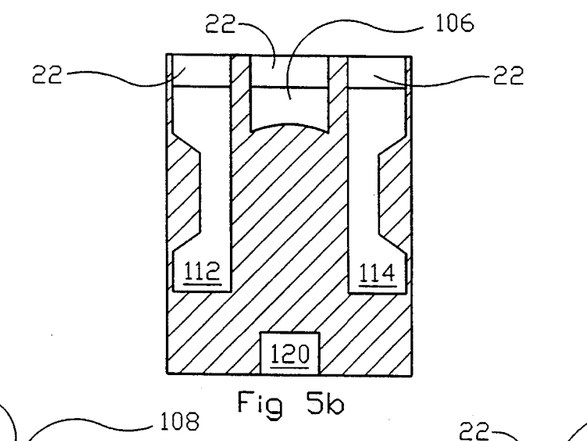
Figure 5C:
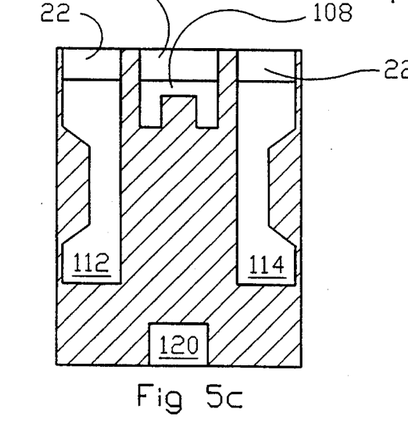
Figure 5D:
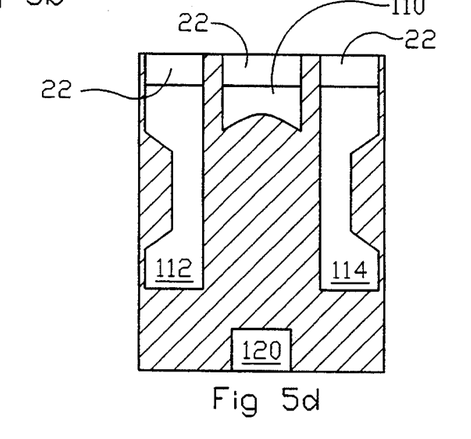

FIGS. 5b–5d show modifications of the slider of FIG. 5a, wherein the center pads 106, 108, 110 are modified to accommodate different skew/velocity ranges for different applications used with negative pressure air bearing sliders of the instant invention.

In a specific environment of FIG. 5a, the length 122 of the rear pad 120 is about 10.7 mils and its width 124 is about 15 mils. The central pad 104 has a width 132 of about 20 mils and a length 130 of about 20 mils. The lengths of the portions of the two side rails are about 20 mils for L11, 25 mils for L12, 50 mils for L13, 55 mils for L14 and 60 mils for L15. The width 116 at the leading and trailing edges of the side rails is about 15 mils and the width 118 of the central portion of the side rails is about 8 mils. The nominal taper angle is 40 minutes and the taper length is 8 mils. A central negative pressure region 128 that is aft of the center pad 104 is etched to a nominal depth of about 200 microinches below the air bearing surface. Side reliefs 126 are etched to the same depth of 200 microinches. The relief vents 133 are about 5 mils wide.

Figure 6:
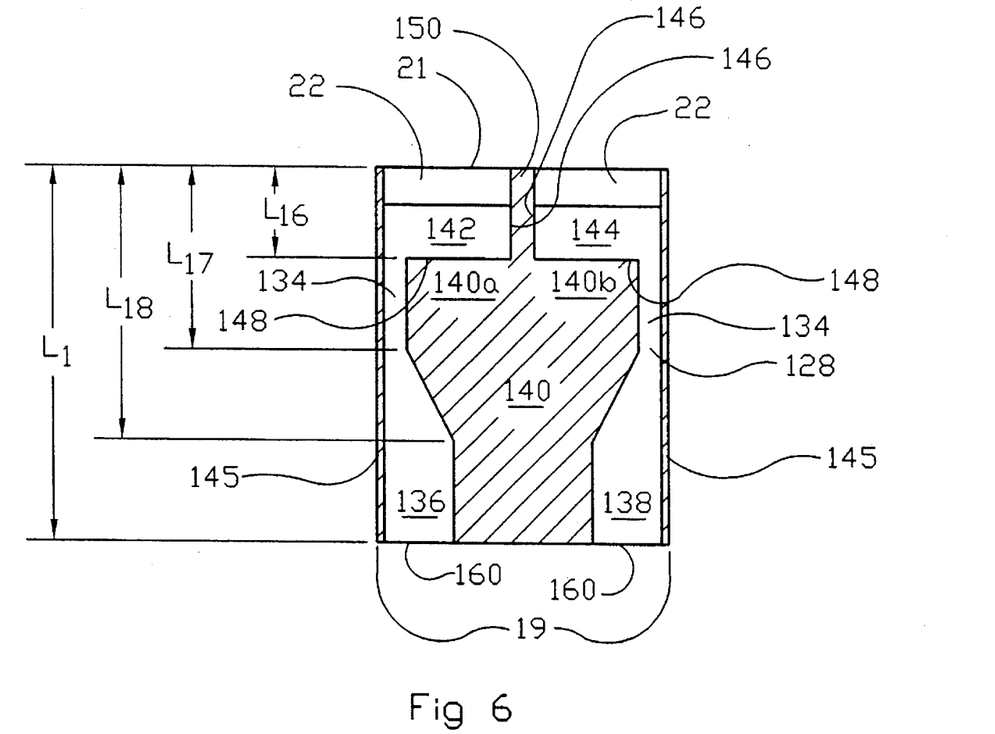
FIG. 6 is a plan view of a negative pressure air bearing slider having a single relief vent at the slider leading edge.

FIG. 6 illustrates a novel embodiment of a negative pressure slider having a single central relief vent 150 at the slider leading edge and a negative pressure cavity 140, both of the same depth. The central relief vent 150 acts during operation of the air bearing slider to establish an ambient pressure channel longitudinally along the center of the slider effectively dividing the negative pressure cavity 140 into two negative pressure sections 140a and 140b. At the leading edge behind tapered sections 22, two pads 142, 144 are disposed having the same width as the tapered sections 22. The widths of the two leading pads 142, 144 are designated by reference numeral 148 and extend to the inboard side of relief sections 145 from the central relief vent 150. The lengths of the pads 142, 144 are designated as 146. The width of the trailing edge portions of the rails 136, 138 is designated by 160. The rails 136, 138 include a narrow rectangular section 134 following the pads 142, 144. Between the rail section 134 and the trailing edge portions of the rails 136, 138, and angled section 147 is formed. The length L16 extends from the leading edge to the rear of the pads 142, 144. The narrow section 134 extends from the rear of the pads at L16 to L17 and the angled section 147 extends from L17 to L18.

In a specific embodiment of the negative pressure slider shown in FIG. 6, the width of the pads 142, 144 is about 28 mils and the length 146 of the pads is about 20 mils. The central relief vent 150 has a width of about 4 mils. The narrow rectangular sections 134 are 5 mils in width. The length L17 from the leading edge of the slider is 40 mils. The length L18 from the leading edge of the slider is 60 mils. The width 160 of the rail at the trailing edge is about 15 mils. The overall length L1 of the slider body is about 80.7 mils and its width is about 63 mils.

Figure 7:
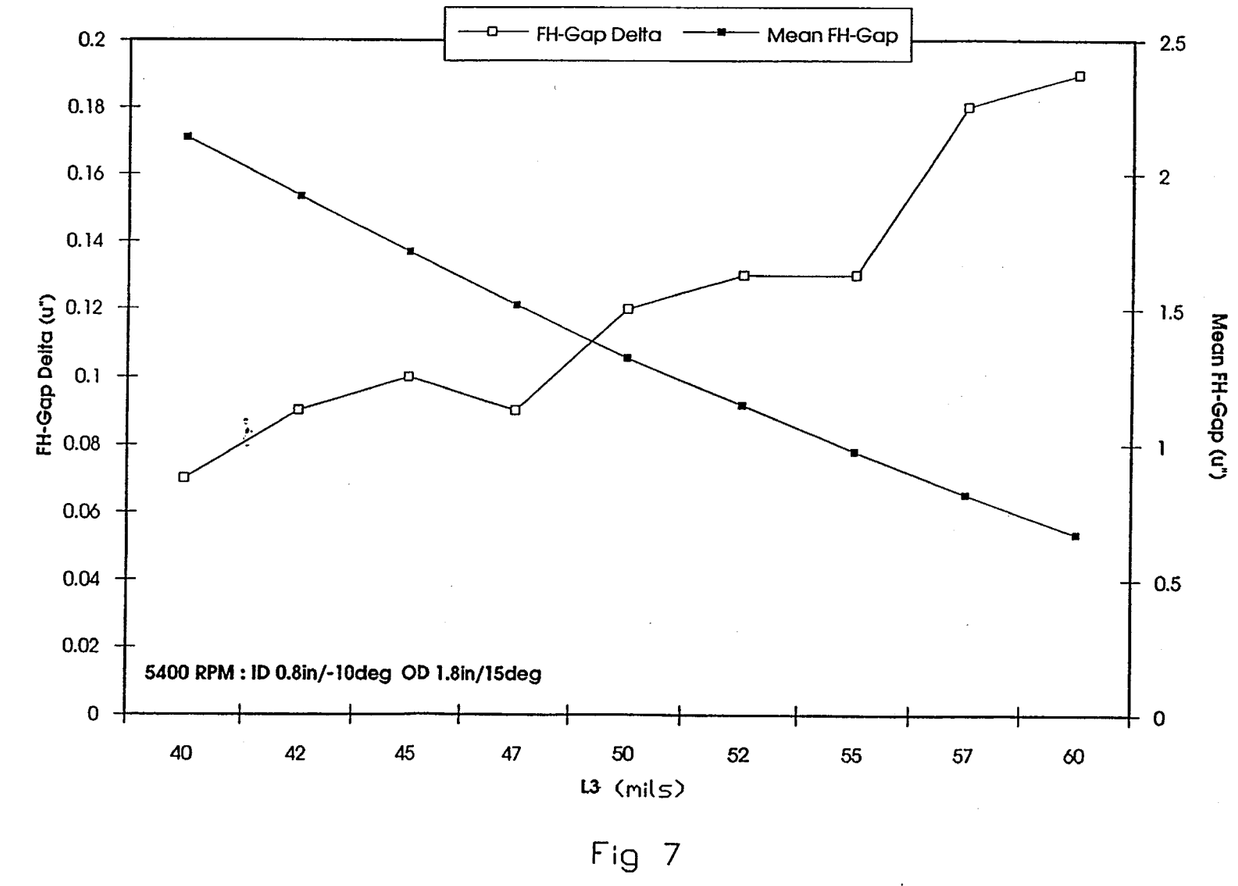
FIG. 7 are plots of flying height variations relative to a partial length L3 of the slider, as shown in FIG. 1.
Figure 8:
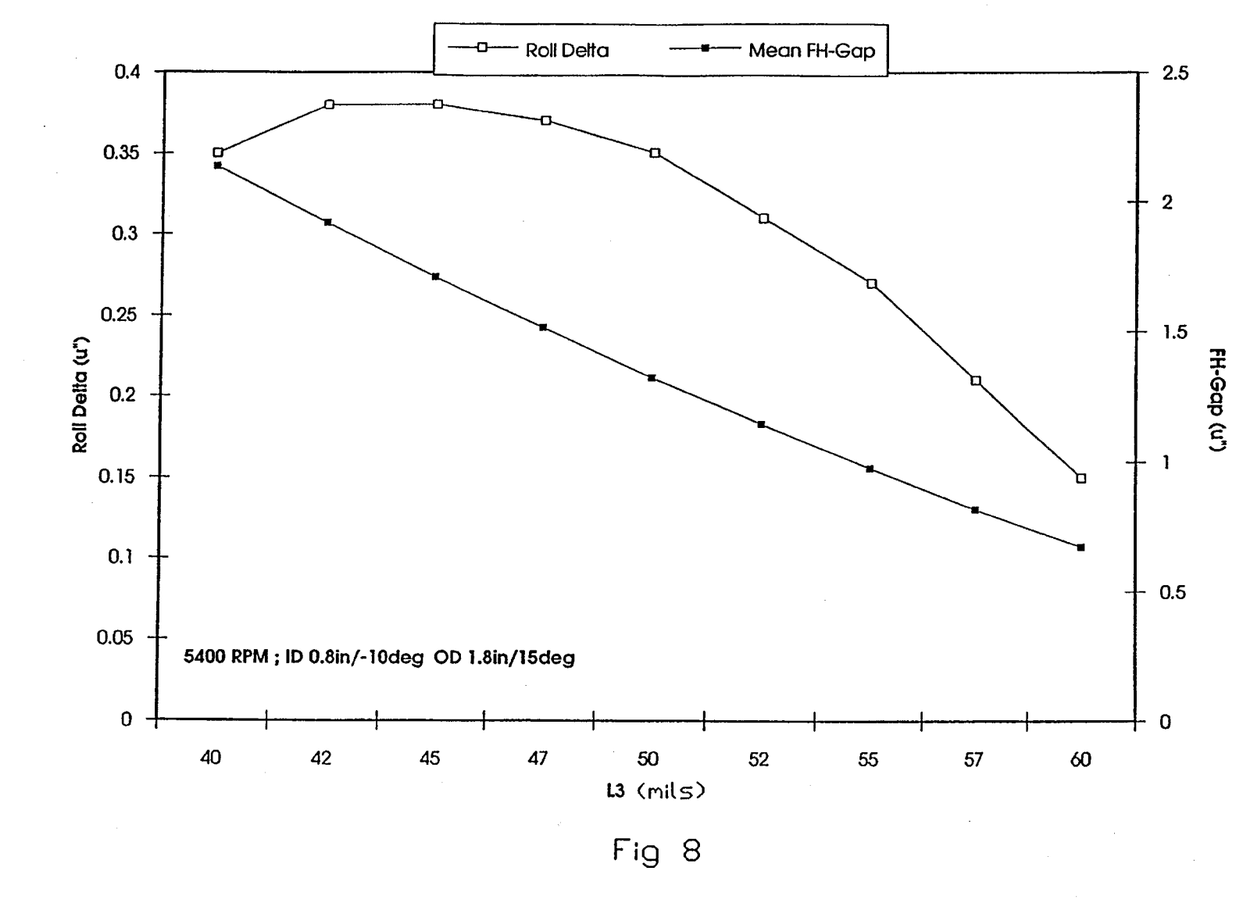
FIG. 8 are plots of slider roll variations relative to the length L3.

FIGS. 7 and 8 are plots that illustrate the variations in flying height and roll of a negative pressure air bearing slider, made in accordance with the configuration of FIG. 1. In a specific implementation, the diverging portion of rails 10 and 12 are angled at about 45° relative to the length dimension of the rails. When increasing the length L3, which is the length from the leading edge of the slider to the point of divergence of the rail structure, the wider portion of rails 10 and 12 at the trailing edge of the slider are made shorter. In this way, the flying height of the slider and the magnetic transducer that is deposited at the trailing edge of the slider can be adjusted to accommodate different disk drive applications. FIG. 7 shows the mean flying height of the transducer gap measured against the length L3, where the mean flying height is defined as the average flying height over the skew angle/disk radius range of −10°/0.8 inch to +15°/1.8 inch for a disk rotation of 5400 revolutions per minute (rpm). FIG. 7 further illustrates the maximum change in flying height (Δ microinches) over the same skew angle/disk radius range. For example, for all values of L3 the Δ in microinches would be less than 0.25 microinch.

FIG. 8 similarly illustrates the roll of the slider of FIG. 1. Roll is defined as the difference in flying height between rails 10 and 12, which is positive and less than 0.4 microinch thus indicating that the rail at which the magnetic transducer is deposited on the trailing end of the slider is always the lower flying rail. In this implementation, the rail with which the DOWN transducer is associated is rail 12 whereas the UP transducer is associated with rail 10. The UP transducer is associated with the upper surface of a rotating magnetic disk and the DOWN transducer is associated with the lower surface of a rotating magnetic disk. It is always desirable for roll to be positive, as shown in FIG. 8 for the illustrated embodiments.

Figure 9:
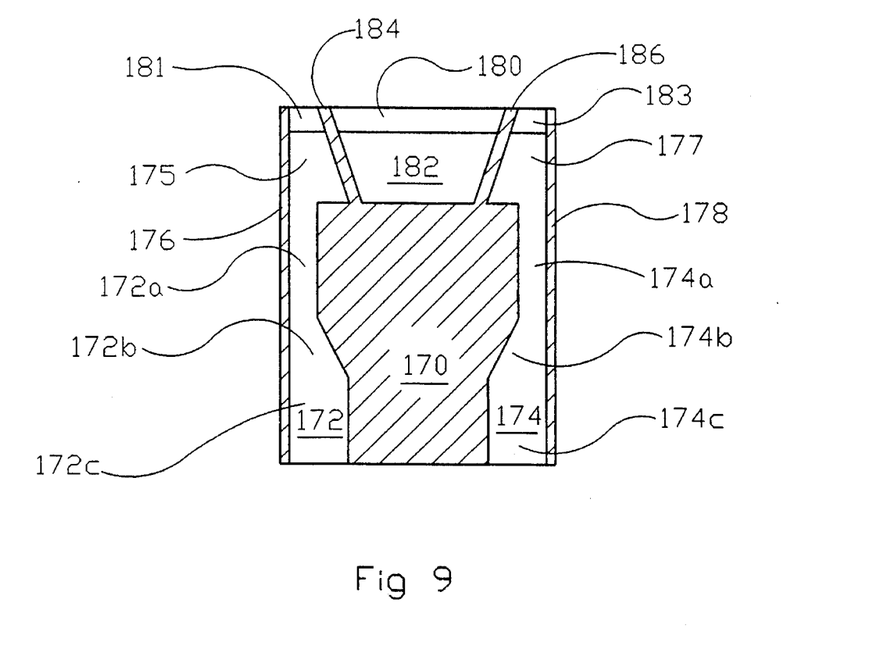
FIGS. 9 and 10 are plan views of alternative embodiments of negative pressure air bearing sliders having angled relief vents at the slider leading edge.

FIG. 9 illustrates a negative pressure air bearing slider having a central recess 170 between side rails 172 and 174. The rails are configured respectively with narrow rectangular portions 172a and 174b, angled portions 172b and 174b and 175 and 177. Wide rectangular portions 172c and 174c are disposed at the trailing ends of the side rails 172 and 174. Side reliefs 176 and 178 are provided at the sides of the slider body. In this embodiment, angled relief vents 184 and 186 are provided between the central pad 182 and the angled portions 175 and 177 and between the central taper 180 and the side tapers 181 and 183 respectively. The relief vents 184 and 186 are angled inwardly and converge towards the central recess 170.

Figure 10:
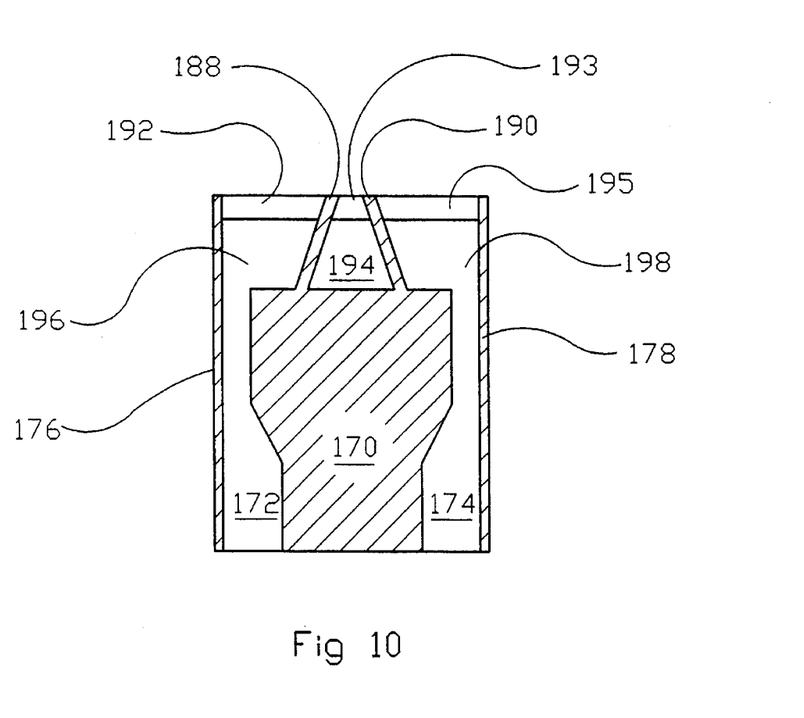

FIG. 10 illustrates another embodiment similar to the embodiment of FIG. 9, except that the angles of the portions 196 and 198, the central pad 194, the front end tapers 192, 193 and 195 are reversed so that the relief vents 188 and 190 diverge towards the central recess 170.

An advantage of the invention is the simplicity and symmetry of the geometry which results in ease of manufacture and a high degree of tolerance to variations in the manufacture process. A major advantage is that the slider design effectively maintains the desired stable flying characteristics of the slider relative to a rotating magnetic disk. The novel slider design requires only a single etch step during production. The inventive sliders have a high degree of tolerance to manufacturing variables. The symmetrical design relative to the longitudinal axis of the slider allows the sliders to be used as UP or DOWN magnetic heads.

It should be understood that the particular dimensions, angles and other parameters set forth above may be varied for different applications of air bearing sliders used in disk drive operation. For example, the described angled sections of the rails may be formed with angles between 15° and 75°. The relief vents of this invention may have a width in the range of 1–8 milli-inches and may be etched to a depth that is ⅛ to ⅞ the depth of the central negative pressure cavity, as well as to the same depth, which may be in the range of 50–500 microinches. The crown on the air bearing surface of the slider may have a height of 0.2–1.2 microinches. The side reliefs may have a width in the range of 0–2 milli-inches. The rear pad shown in FIGS. 5a–5d may have a width in the range of 5–20 milli-inches. Other modifications in dimensions or shapes may be made to the negative pressure air bearing slider having one or more relief vents within the scope of this invention.

What is claimed is:

1. A negative pressure air bearing slider having an air bearing surface with a leading edge and a trailing edge and defining opposing first and second sides between said edges comprising:

first and second tapered regions disposed at said leading edge and adjacent to said respective first and second sides;

a third tapered region disposed at said leading edge and centered substantially between said first and second tapered regions;

first and second side rails extending from said first and second tapered regions respectively;

pad means extending from said tapered regions and located symmetrically or centrally between said first and second side rails;

a negative pressure recessed cavity extending from said pad means towards said trailing edge; and at least one relief vent disposed adjacent to said pad means and extending from said leading edge to said negative pressure recessed cavity.

2. A negative pressure air bearing slider as in claim 1, wherein said at least one relief vent comprises two relief vents.

3. A negative pressure air bearing slider as in claim 1, wherein said first and second side rails each have at one end a first rectangular section and at the trailing end of each rail a second rectangular section, and an angled section between said first and second rectangular sections.

4. A negative pressure air bearing slider as in claim 1, wherein said angled section has a side disposed at an angle between 15° and 75° relative to said rectangular sections.

5. A negative pressure air bearing slider as in claim 1, wherein said leading edge relief vent is 1 to 8 milli-inches in width.

6. A negative pressure air bearing slider as in claim 1, wherein said leading edge relief vent is etched to the same depth as that of said negative pressure recessed cavity.

7. A negative pressure air bearing slider as in claim 1, wherein said leading relief vent is etched to a depth of ⅛ to ⅞ of the depth of said negative pressure recessed cavity.

8. A negative pressure air bearing slider as in claim 1, wherein said first and second rails extend continuously from said first and second tapered regions to said trailing edge of said slider.

9. A negative pressure air bearing slider as in claim 1, wherein said first and second rails extend only partially from said first and second tapered regions to said trailing edge of said slider.

10. A negative pressure air bearing slider as in claim 1, including a supporting pad for a magnetic transducer disposed substantially centrally at the trailing edge of said slider.

11. A negative pressure air bearing slider as in claim 1, wherein said side rails are formed with a recessed negative pressure region at the outboard sides of said side rails.

12. A negative pressure air bearing slider as in claim 11, wherein said first and second side rails extend only partially from said first and second tapered regions towards said slider trailing edge.

13. A negative pressure air bearing slider as in claim 12, including a supporting pad for supporting a magnetic transducer, said supporting pad being disposed at said trailing edge and substantially centrally relative to said sides of said slider.

14. A negative pressure air bearing slider as in claim 1, wherein said central pad is substantially rectangular.

15. A negative pressure air bearing slider as in claim 1, wherein said central pad is configured with an arcuate side adjacent to said recessed cavity.

16. A negative pressure air bearing slider as in claim 1, wherein said central pad is configured as an inverted U.

17. A negative pressure air bearing slider as in claim 1, wherein said recessed cavity is etched to a depth between 50 to 500 microinches.

18. A negative pressure air bearing slider as in claim 1, including a crown formed on the air bearing surface of said slider.

19. A negative pressure air bearing slider as in claim 18, wherein said crown is formed to a height between 0.2–2.0 microinches.

20. A negative pressure air bearing slider as in claim 1, including side reliefs formed along the sides of said slider.

21. A negative pressure air bearing slider as in claim 20, wherein said side reliefs have a width in the range of 0–2 milli-inches.

22. A negative pressure air bearing slider as in claim 1, including a rear pad extending from said trailing edge and located substantially centrally between said sides of said slider.

23. A negative pressure air bearing slider as in claim 22, wherein said rear pad is about 5–20 milli-inches wide.

24. A negative pressure air bearing slider having an air bearing surface with a leading edge and a trailing edge and defining opposing first and second sides between said edges comprising:

first and second tapered regions disposed at said leading edge and adjacent to said respective first and second sides;

first and second side rails extending from said first and second tapered regions respectively;

each of said side rails having a first narrow rectangular section and a laterally extending pad connected to said first rectangular section, said first rectangular section and said laterally extending pad of said rails extending from a respective tapered region, a second rectangular section adjacent to said trailing edge of said slider, and at least one angled section disposed between said first rectangular section and said second rectangular section;

a negative pressure recessed area between said side rails extending from said trailing edge of said slider to said pads connected to said side rails; and a single recessed channel disposed substantially centrally between said tapered regions and between said laterally extending pads, said recessed channel extending from said leading edge to connect with said negative pressure recessed area.

25. A negative pressure air bearing slider as in claim 24, including a rear pad extending from said trailing edge and located substantially centrally between said sides of said slider.

26. A negative pressure air bearing slider as in claim 25, wherein said rear pad is about 5 to 20 milli-inches wide.

27. A negative pressure air bearing slider as in claim 24, wherein said recessed channel has a depth that is ⅛ to ⅞ the depth of said negative pressure recessed area.

28. A negative pressure air bearing slider having an air bearing surface with a leading edge and a trailing edge and defining opposing first and second sides between said edges comprising:

first and second tapered regions disposed at said leading edge and adjacent to said respective first and second sides;

a third tapered region disposed at said leading edge and centered substantially between said first and second tapered regions, said first, second and third tapered regions having angled sides;

first and second side rails extending from said first and second tapered regions respectively, said side rails having angled portions;

pad means extending from said tapered regions and located symmetrically or centrally between said first and second side rails, said pad means having angled sides of substantially the same angles defined by the angled sides of said third tapered region;

a negative pressure recessed cavity extending from said pad means towards said trailing edge; and at least one relief vent disposed adjacent to said pad means and extending from said leading edge to said negative pressure recessed cavity, said relief vent being angled relative to said leading edge of said slider.

29. A negative pressure air bearing slider as in claim 28 wherein said angled relief vent converges from the leading edge to the central pad.

30. A negative pressure air bearing slider as in claim 28 wherein said angled relief vent diverges from the leading edge to the central pad.

* * * * *